United States Patent [19]

Nakamura et al.

[11] Patent Number: 4,669,567
[45] Date of Patent: Jun. 2, 1987

[54] VEHICLE STEERING SYSTEM

[75] Inventors: Kenji Nakamura; Yasuji Shibahata, both of Yokohama; Yukio Fukunaga, Zushi; Yasumasa Tsubota, Yokosuka; Namio Irie; Junsuke Kuroki, both of Yokohama, all of Japan

[73] Assignee: Nissan Motor Co., Ltd., Japan

[21] Appl. No.: 754,721

[22] Filed: Jul. 15, 1985

[30] Foreign Application Priority Data

Jul. 17, 1984 [JP] Japan ................................. 59-147015

[51] Int. Cl.⁴ .......................... B62D 5/08; B62D 7/14
[52] U.S. Cl. ............................... 180/140; 74/388 PS; 92/7; 92/131; 180/141; 280/91
[58] Field of Search ............... 180/140, 141, 142, 143, 180/79.1, 79; 74/388 PS; 92/131, 7; 280/91

[56] References Cited

U.S. PATENT DOCUMENTS 3,063,424  11/1962  Kutsche ............................ 92/131 X
4,440,254  4/1984  Shibahata et al. ................. 180/140
4,441,572  4/1984  Ito et al. ............................... 180/143
4,552,239  11/1985  Kanazawa et al. ................. 180/140

FOREIGN PATENT DOCUMENTS 60974  4/1982  Japan .................................... 180/143
81274  5/1984  Japan ...................................... 180/79

Primary Examiner—John J. Love
Assistant Examiner—Mitchell J. Hill
Attorney, Agent, or Firm—Leydig, Voit & Mayer

[57] ABSTRACT

A vehicle steering system in which both front and rear road wheels are turnable in opposite directions upon low speed running and in the same direction upon high speed running, and the angle of turning of the rear road wheels for a given steering effort on a steering wheel is varied so that a large angle of turning of the rear road wheels is obtained during low speed running and a small angle of turning of the rear road wheels is obtained during high speed running.

5 Claims, 3 Drawing Figures

VEHICLE STEERING SYSTEM

BACKGROUND OF THE INVENTION

1. Field of the Invention

The present invention relates to vehicle steering systems in which both front and rear road wheels are steerable.

2. Description of the Prior Art

A vehicle steering system is known that is constructed so that during low speed cornering of the vehicle the rear road wheels are turned in the direction opposite to the direction of turning of front road wheels and during high speed cornering the rear wheels and are turned in the same direction, the turning of the front wheels as is disclosed in U.S. Pat. No. 4,440,254 issued on Apr. 3, 1984 in the name of Shibahata et al and assigned to the same assignee as that of the subject application.

In such a steering system, during low speed running of the vehicle, a large angle of turning of the rear road wheels for a given steering effort on a steering wheel is desirable for efficiently reducing the radius of turning circle of the vehicle. However, during high speed running of the vehicle, a considerably smaller angle of turning of the rear road wheels for a given steering effort on the steering wheel is desirable for good stability of the vehicle.

No prior art steering system can satisfy this desire.

SUMMARY OF THE INVENTION

In accordance with the present invention, there is provided an improved steering system for a vehicle in which both front and rear road wheels are steerable.

The steering system comprises a steering wheel for turning the front road wheels and an actuator for actuating the rear road wheels to turn in the direction opposite to the direction of turning of the front road wheels when the vehicle is running at a speed lower than a predetermined value and in the same direction as the direction of turning of the front road wheels when the vehicle is running at a speed higher than a predetermined value.

In accordance with the present invention, the steering system is provided with means for limiting the angle of turning of the rear road wheels in such a manner that, for a given steering effort on the steering wheel, a large angle of turning of the rear road wheels is obtained when the vehicle is running at a speed lower than the predetermined value, and a small angle of turning of the rear road wheels is obtained when the vehicle is running at a speed higher than a predetermined value.

In one embodiment, the limiting means comprises a housing formed with a cylindrical control chamber with end walls through which a reciprocative piston rod of the actuator extends, the piston rod being connected at its opposed ends to the rear road wheels in such a manner as to turn the same when displaced from a neutral position, a pair of control pistons slidably mounted in the control chamber and also slidably mounted on the piston rod to define a control chamber section variable in volume depending upon relative movement of the control pistons, a coil spring placed around the piston rod and interposed in a pre-loaded state between the control pistons so as to urge the control pistons against the end walls of the housing, the piston rod having a pair of annular shoulders, one on each side of the control chamber section defined by the control pistons, a pair of annular resilient members mounted on the piston rod and interposed between the control pistons and the annular shoulders of the piston rod, and a hydraulic control device for controlling supply of hydraulic fluid under pressure to the control chamber and drainage of hydraulic fluid from the control chamber in such a manner that axial movement of the piston rod out of its neutral postion is limited by the resilient members when the vehicle is running at a speed higher than a predetermined value.

It is an object of the present invention to provide a vehicle steering system of the above kind which is effective for improving the stability of a vehicle during high speed running without substantially deteriorating its basic purpose of such a steering system, to enable the vehicle to make turns of small radii.

It is another object of the present invention to provide a vehicle steering system of the above mentioned character which is simple in structure and therefore economical to manufacture.

BRIEF DESCRIPTION OF THE DRAWINGS

The features and advantages of the vehicle steering system according to the present invention will become more clearly appreciated from the following description taken in conjunction with the accompanying drawings, in which.

DETAILED DESCRIPTION OF THE PREFERRED EMBODIMENTS

Figure 1:
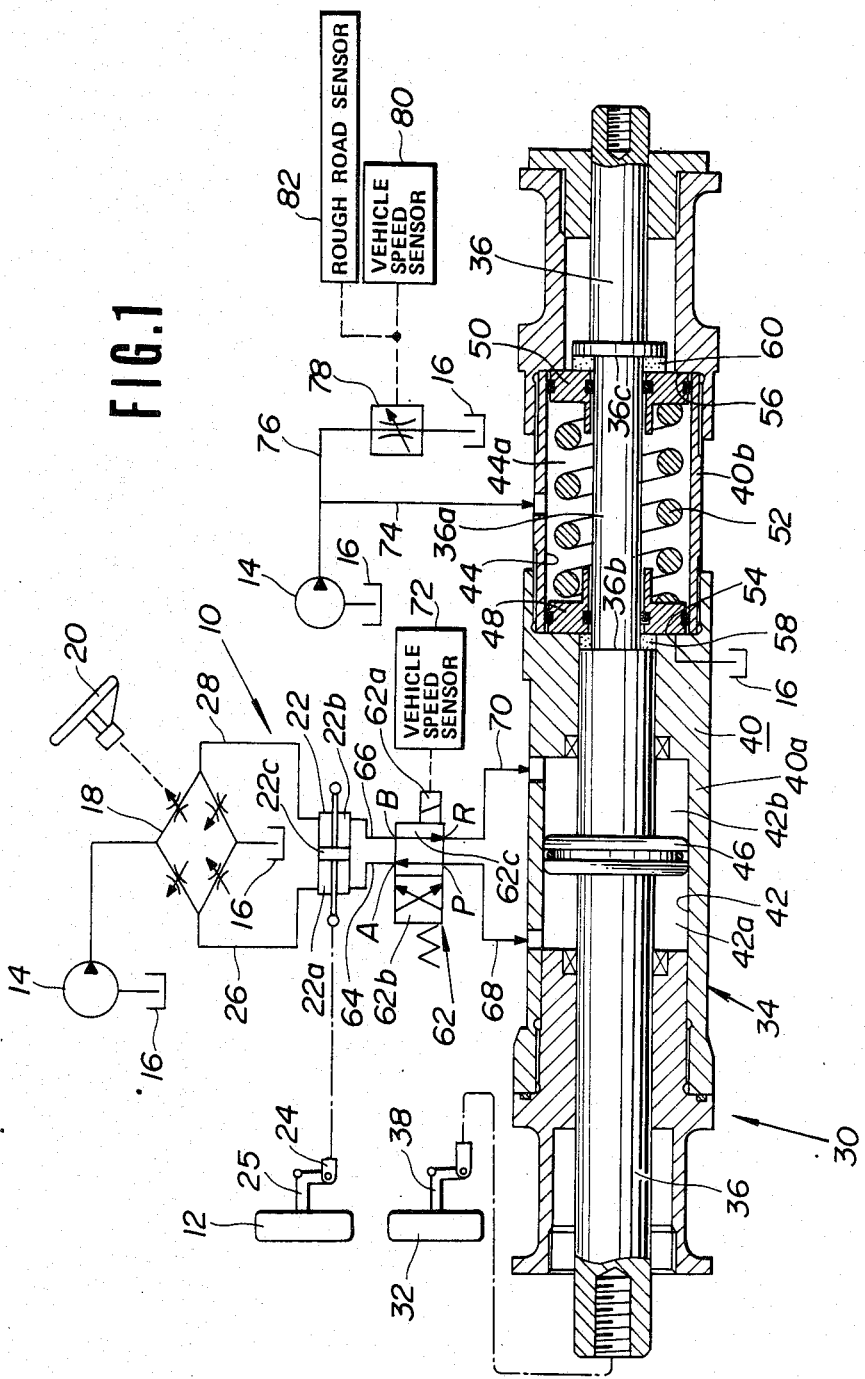
FIG. 1 is a schematic plan view of a vehicle equipped with a steering system according to an embodiment of the present invention.

Referring first to FIG. 1, an embodiment of the present invention will be described. In the drawing, the reference numeral 10 indicates a power steering unit which is associated with front road wheels 12 (only one is shown). The power steering unit 10 includes a hydraulic pump 14 having an inlet fluidly connected to a reservoir 16. A control valve 18 of the power steering unit 10 is in fluid communication with the pump 14 and responsive to rotation of a steering wheel 20. A power cylinder, or hydraulic servo, 22 is operatively connected a tie rod 24 and knuckle arms 25 (only one is shown) to the front road wheels 12 and fluidly connected to the control valve 18 in such a manner that when the steering wheel 20 is turned to the left, or in the counterclockwise direction, a chamber 22a of the servo 22 is pressurized with hydraulic fluid from the pump 14 through conduit 26. This drives a piston 22c of the servo 22 to stroke to the right in the drawing to assist the steering of the front road wheels 12 to the left. Conversely, when the steering wheel 20 is rotated to the right or in the clockwise direction, a chamber 22b of the servo 22 is pressurized through a conduit 28 and the piston 22c is driven to stroke to the left in the drawing to assist the turning of the front road wheels 12 to the right.

The reference numeral 30 generally indicates an actuator for the steering of rear road wheels 32 (only one is shown). The actuator 30 includes a power cylinder 34 which comprises a reciprocative piston rod 36 connected at its ends to knuckle arms 38 (only one is shown) which are in turn connected to the rear road wheels 32. In accordance with the present invention, the actuator 30 is adapted to turn the rear road wheels 32 in such a manner that for a given effort on the steering wheel 20, a large angle of turning of the rear road wheels 32 is obtained during low speed running of the vehicle while a small angle of turning of the rear road wheels 32 is obtained during high speed running of the vehicle.

More specifically, the power cylinder 34 comprises a hollow cylindrical housing 40 through which the piston rod 36 passes and projects from the ends thereof. The housing 40 comprises a cylindrical power chamber 42 and a control chamber 44. The power and control chambers 42 and 44 are axially aligned with each other and fluidly separated from each other. An annular power piston 46 is fixedly mounted on the piston rod 36 to move together therewith and divides the power chamber 42 into fluidly separated first and second power chamber sections 42a and 42b.

A pair of annular control pistons 48 and 50 are slidably mounted within the control chamber 44 and around piston rod 36 to define a control chamber section 44a, variable in volume depending upon relative positions of the control pistons 48 and 50. To prevent production of vacuum upon movement of the control piston 48 toward the other piston 50, the corresponding end of the control chamber 44 is connected to the reservoir 16. The other end of the control chamber 44 is vented to the atmosphere. A coil spring 52 is interposed between the control pistons 48 and 50 and placed, in a pre-loaded state, around the pistons rod 36 so as to urge the control pistons 48 and 50 against annular walls 54 and 56 of the housing 40 which defines the ends of the control chamber 44. The piston rod 36 has a rod section 36a on which the control pistons 48 and 50 are slidable and is formed with a pair of annular shoulders 36b and 36c located outside the chamber formed by control pistons 48 and 50. A pair of annular resilient members 58 and 60, which may be made of rubber, for example, are mounted on the piston rod section 36a interposed between the shoulders 36b and 36c and the control pistons 48 and 50, respectively. The resilient members 58 and 60 and the shoulders 36b and 36c are so arramged that when the piston rod 36 is in its neutral position the rear road wheels 32 assume their neutral positions or straight ahead positions, and the space between shoulder 36b and piston 48 is equal to the space between shoulder 36c and piston 50 and the resilient members 58 and 60 are compressed slightly and equally.

The reference numeral 62 indicates a directional control valve which is of the four port, two position, type and comprises A, B ports connected through conduits 64 and 66 to the chambers 22a and 22b, respectively, of the power steering servo 22, and P and R ports connected through conduits 68 and 70 to the first and second power chamber sections 42a and 42b, respectively. A vehicle speed sensor 72 is provided for sensing the running speed of the vehicle and produces a signal representative thereof. The valve position of the directional control valve 62 is controlled on the basis of the signal from the vehicle speed sensor 72 as follows. When the vehilce is running at a speed lower than a predetermined value a solenoid 62a of the directional control valve 62 is energized in response to the signal from the vehicle speed sensor 72 and causes the control valve 62 to assume valve position 62b where the A port is fluidly connected to the R port while the P port is to the B port. On the other hand, when the vehicle is running at a speed higher than the predetermined value, the solenoid 62a is de-energized to cause the control valve 62 to assume a valve position 62c where the P port is fluidly connected to the A port while the B port is fluidly connected to the R port.

The control chamber section 44a is fluidly connected through a conduit 74 to the outlet of the pump 14. A conduit 76 branches off from the conduit 74 to fluidly connect the same to the reservoir 16 by way of a throttle valve 78. The throttle valve 78 is adapted to control communication between the conduit 74 and the reservoir 16 on the basis of signals from a vehicle speed sensor 80 and a rough road sensor 82 in such a manner that when the vehicle is running at a speed higher than a predetermined value, or when the vehicle is running over a rough road, the throttle valve 78 increasingly throttles fluid flow, thereby increasing the fluid pressure in the control chamber section 44a and restricting an angle of turning of the rear road wheels 38 for a given steering effort on the steering wheel 20.

In operation, the steering system is put into an operative condition illustrated in FIG. 1 when the vehicle is running at a speed higher than a predetermined value. In this operative condition of the steering system, the directional control valve 62 assumes the valve position 62c due to de-energization of the solenoid 62a and fluidly connects the conduits 64 and 66 with the conduits 68 and 70, respectively.

Further, in the above operative condition of the steering system, the throttle valve 78 is put into a condition where it throttles fluid flow therethrough to such an extent that the fluid pressure in the control chamber section 44a rises to a certain high value, and the condition expressed by the following formula is obtained:

$$S_1 \cdot P_1 < S_2 \cdot P_2 + F$$

where $S_1$ is the effective area of the piston 46 on which fluid pressure in one of the power chamber sections 42a and 42b acts axially of the piston rod 36, $S_2$ is an effective area of each of the control pistons 48 and 50 on which fluid pressure in the control chamber section 44a acts axially of the piston rod 36, $P_1$ is a fluid pressure in one of the power chamber sections 42a and 42b which is pressurized with fluid pressure from the power steering servo 22, $P_2$ is a fluid pressure in the control chamber section 44a and F is a pre-load applied to the coil spring 52. Due to this, when the steering wheel 20 is rotated to turn the front road wheels 12, the control pistons 48 and 50 do not move at all but are kept in contact with the respective walls 54 and 56 of the housing 40. However, since the resilient member 58 or 60 is compressed between the shoulder 36b, 36c and the control piston 48 or 50, the piston rod 36 strokes to turn the rear road wheels 32 in the same direction as that of the front road wheels 12 and by an angle corresponding to the amount of compression of the resilient member 48 or 50. Accordingly, upon high speed running of the vehicle, the steering system of the present invention allows the rear road wheels 32 to be turned by only a small angle and in the same direction as the front road wheels 12, thus increasing the stability of the vehicle.

When the vehicle is running at a speed lower than the above mentioned predetermined value, the directional control valve 62 assumes the valve position 62b due to energization of the solenoid 62a and fluidly connects the conduits 64 and 66 with the conduits 70 and 68, respectively. Further, in this operative condition of the steering system, the throttle valve 78 allows increased fluid flow therethrough to such an extent that the fluid pressure in the control chamber section 44a falls to a certain low value, and the condition expressed by the following formula is obtained:

$$S_1 \cdot P_1 > S_2 \cdot P_2 + F$$

Due to this, when the steering wheel 20 is rotated to turn the front road wheels to the left or right, the power piston 46 and piston rod 36 stroke in the opposite direction, allowing one of the control pistons 48 and 50 to move toward the other while compressing the coil spring 52. Accordingly, upon low speed running of the vehicle, the rear road wheels 32 are turned in the direction opposite the front wheels 12 and a large angle of turning of the rear road wheels 32 for a given effort on the steering wheel 20 is obtained. The vehicle therefore can make turns of small radii upon low speed running.

Figure 2:
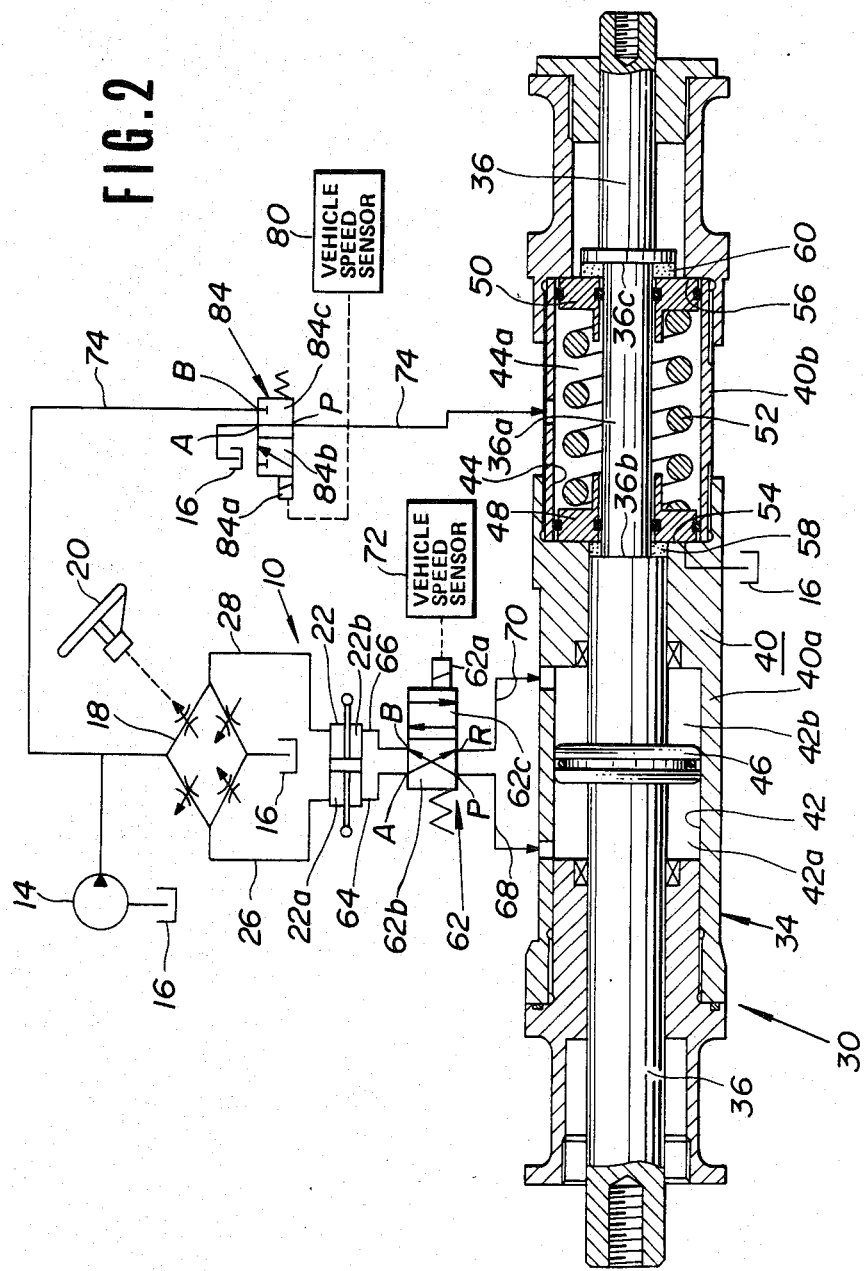
FIGS. 2 and 3 are views similar to FIG. 1 but showing modifications according to the present invention.

FIG. 2 shows a modified embodiment in which parts corresponding to those of the previous embodiment of FIG. 1 are designated by the identical reference characters.

This embodiment differs from the previous embodiment of FIG. 1 in that in place of the conduit 76 and the throttle valve 78, a directional control valve 84 is disposed in the conduit 74 to selectively connect the control chamber section 44a to the reservoir 16 or the pump 14 in accordance with a signal from the vehicle speed sensor 80. More specifically, the directional control valve 84 is of the three port, two position type and comprises port A, fluidly connected to the reservoir 16 and ports B and P connected through the divided parts of the conduit 74 to the pump 14 and the control chamber section 44a, respectively. Upon high speed running of the vehicle, a solenoid 84a of the directional control valve 84 is energized in response to the signal from the vehicle speed sensor 80 and causes the control valve 84 to assume a valve position 84b where part P is fluidly connected to port B while the port A is held closed. On the other hand, upon low speed running of the vehicle, the solenoid 84a is de-energized and causes the control valve 84 to assume a valve position 84c where the port P is fluidly connected to port A and the port B is held closed.

When the vehicle is running at low speed, the steering system is put into the operative condition illustrated in FIG. 2. In this operative condition, the fluid pressure in the control chamber section 44a becomes equal to the atmospheric pressure since the control chamber section 44a is fluidly connected to the reservoir 16. When this is the case, the condition expressed by the following formula is obtained:

$$S_1 \cdot P_1 > S_2 \cdot P_2 + F$$

Further, the vehicle speed sensor 72 causes the directional control valve 62 to assume the valve position 62b so that the conduits 68 and 70 connect ports A and B to the first and second power chamber sections 42a and 42b reversely, as in the previous embodiment.

Thus, when the steering wheel 20 is rotated to turn the front road wheels 12 to the left or right by an effort larger than a predetermined value, the rear road wheels 32 are turned largely in the direction opposite to the direction of turning of the front road wheels 12.

Upon high speed running of the vehicle, the vehicle speed sensor 72 causes the direction control valve 62 to assume the valve position 62c while the vehicle speed sensor 80 causes the directional control valve 84 to assume the valve position 84b. Due to this, the condition expressed by the following formula is obtained:

$$S_1 \cdot P_1 < S_2 \cdot P_2 + F$$

Thus, when the steering wheel 20 is rotated to turn the front road wheels 12 to the right or left, the control pistons 48 and 50 do not move at all but are kept in contact with the respective walls 54 and 56 of the housing 40. The rear road wheels 32 are therefore turnable by only a small angle corresponding to the amount of compression of the resilient member 58 or 60 and in the same direction as that of the front road wheels 12. This embodiment therefore produces substantially the same effect as that of the previous embodiment.

Figure 3:
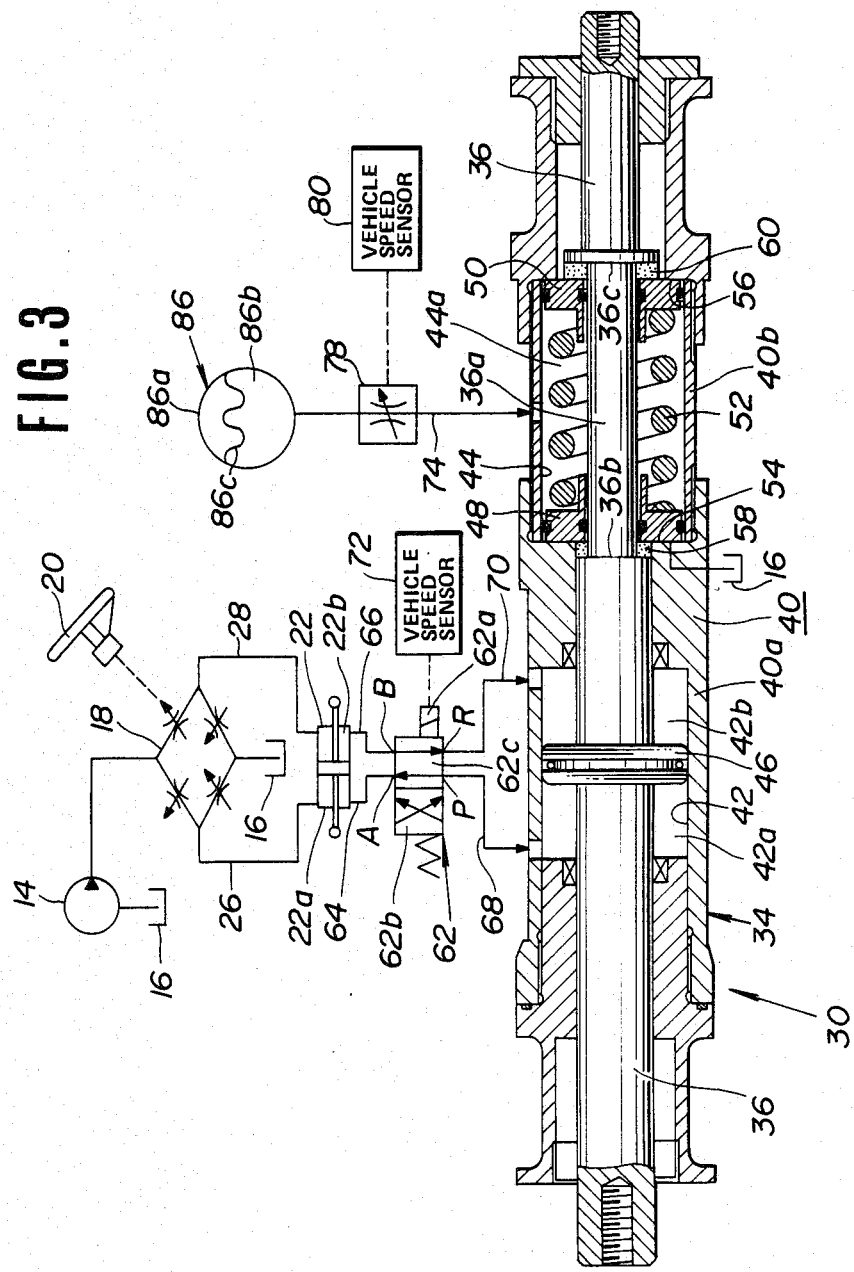

FIG. 3 shows a further modification in which like or corresponding parts to those of the previous embodiment of FIG. 1 are designated by the same reference characters.

This embodiment differes from the previous embodiment of FIG. 1 in that the control chamber section 44a is fluidly connected through the throttle valve 78 to an accumulator 86. More specifically, the accumulator 86 has an air chamber section 86a and a hydraulic fluid chamber section 86b which are separated by a diaphram member 86c. The control chamber section 44a is communicable with the hydraulic fluid chamber section 86b under the control of the throttle valve 78.

With this modified arrangement, when the vehicle is running at a low speed, the vehicle speed sensor 80 causes the throttle valve 78 to fully open, whereby to maintain the fluid pressure in the control chamber section 44a at a low level. This results in the condition expressed by the following formula:

$$P_1 \cdot S_1 > P_2 \cdot S_2 + F$$

Upon high speed running of the vehicle, the vehicle speed sensor 80 causes the throttle valve 78 to fully close. Due to this, the control chamber section 44a cannot vary in volume and, the control piston 48 or 50 do not move upon steering of the front road wheels 12.

This embodiment produces substantially the same effect as the previous embodiment of FIG. 1.

What is claimed is:

1. A steering system for a motor vehicle having steerable front and rear road wheels, comprising:
   a steering wheel for turning the front road wheels;
   a hydraulic actuator for actuating the rear road wheels to turn through an angle in the direction opposite to the direction of turning of the front road wheels when the vehicle is running at a speed lower than a predetermined value and in the same direction as the direction of turning of the front road wheels when the vehicle is running at a speed higher than the predetermined value, said actuator comprising a hollow housing and a reciprocative piston rod passing through said hosuing to be connected at the opposed ends thereof to the rear road wheels in such a manner as to turn the same when displaced from a neutral position thereof, and in which said limiting means comprises a cylindrical control chamber formed in said housing and through which said piston rod extends, said control chamber having opposed axial ends defined by walls of said housing, a pair of control pistons slidably mounted in said control chamber and also on said piston rod to define a control chamber section between their inner sides variable in volume depending upon relative movement of said control pistons, a coil spring placed around said piston rod and interposed in a pre-loaded state between said control pistons so as to urge said control pistons against said walls of said housing, said piston rod having a pair of shoulders on the outer sides of said control pistons, a pair of resilient members mounted on said piston rod and interposed between said control pistons and said shoulders of said piston rod, and a hydraulic control device for controlling supply of hydraulic fluid under pressure to said control chamber and drainage of hydraulic fluid from said control chamber in such a manner that axial movement of said piston rod out of the neutral position thereof is limited to a resiliently compressive amount by said resilient members when the vehicle is running at a speed higher than the predetermined value; and means for resiliently limiting the angle of turning of the rear road wheels for a given steering effort on said steering wheel in such a manner that the resilient limit of the angle of turning of the rear road wheels is large when the vehicle is running at a speed lower than a predetermined value but the resilient limit of the angle of turning of the rear road wheels is small when the vehicle is running at a speed higher than the predetermined value.

2. A steering system as set forth in claim 1, in which said hydraulic control device is operative to supply hydraulic fluid under pressure to said control chamber section so that said control pistons are kept in contact with said walls of said housing during the time when the vehicle is running at a speed higher than the predetermined value and also operative to drain said control chamber section so that said control pistons are movable toward each other while compressing said coil spring when the vehicle is running at a speed lower than the predetermined value.

3. A steering system as set forth in claim 1, in which said hydraulic control device is operative to supply hydraulic fluid of a relatively low pressure to said control chamber section in a manner to prevent discharge of hydraulic fluid from said control chamber section so that said control pistons are kept in contact with said walls of said housing during the time when the vehicle is running at a speed higher than the predetermined value and allow discharge of hydraulic fluid from said control chamber section so that said control pistons are movable toward each other while compressing said coil spring during the time when the vehicle is running at a speed lower than the predetermined value.

4. A steering system as set forth in claim 3, in which said hydraulic control device comprises an accumulator having an air chamber section and a hydraulic fluid chamber section, a conduit fluidly connecting said hydraulic fluid chamber section of said accumulator to said control chamber section, a vehicle speed sensor for sensing speed of the vehicle and producing a signal representative thereof and a throttle valve disposed in said conduit and operative to selective provide and obstruct communication between said hydraulic fluid chamber section of said accumulator and said control chamber section in accordance with the signal from said vehicle speed sensor.

5. A steering system as set forth in claim 1, further comprising a power steering unit having a hydraulic servo including a first and second chamber fluidly separated by a piston, one of which is pressurized while the other is drained to assist turning of the front road wheels, a power chamber formed in said housing through which said piston rod extends, an annular power piston slidably mounted in said power chamber and dividing said power chamber into fluidly separated first and second power chamber sections and fixedly mounted on said piston rod to move together therewith, a first and second conduit means for fluidly connecting said first and second chambers to said first and second power chamber sections, respectively and reversibly, a vehicle speed sensor for sensing speed of the vehicle and producing a signal representative thereof, and a directional control valve disposed in said conduit means for controlling connections between said first and second chambers and said first and second power chamber sections through said first and second conduit means in accordance with the signal from said vehicle speed sensor.

* * * * *